United States Patent
Miyahara et al.

(10) Patent No.: US 12,462,566 B2
(45) Date of Patent: Nov. 4, 2025

(54) COMPUTER-READABLE RECORDING MEDIUM STORING ALERT OUTPUT PROGRAM, ALERT OUTPUT METHOD, AND INFORMATION PROCESSING DEVICE

(71) Applicant: Fujitsu Limited, Kawasaki (JP)

(72) Inventors: Natsuki Miyahara, Sagamihara (JP); Ryosuke Kawamura, Sunnyvale, CA (US)

(73) Assignee: Fujitsu Limited, Kawasaki (JP)

( * ) Notice: Subject to any disclaimer, the term of this patent is extended or adjusted under 35 U.S.C. 154(b) by 84 days.

(21) Appl. No.: 18/489,930

(22) Filed: Oct. 19, 2023

(65) Prior Publication Data
US 2024/0212354 A1    Jun. 27, 2024

(30) Foreign Application Priority Data

Dec. 21, 2022    (JP) .................... 2022-204996

(51) Int. Cl.
*G06V 20/52*    (2022.01)
*G06T 7/20*    (2017.01)
(Continued)

(52) U.S. Cl.
CPC ............. *G06V 20/52* (2022.01); *G06T 7/20* (2013.01); *G06T 7/70* (2017.01); *G06V 10/25* (2022.01);
(Continued)

(58) Field of Classification Search
CPC ...... G06V 20/52; G06V 10/25; G06V 10/764; G06V 40/20; G06V 2201/07; G06T 7/20; G06T 7/70; G06T 2207/30196
(Continued)

(56) References Cited

U.S. PATENT DOCUMENTS 11,763,366 B1 *  9/2023  Derza ............... B64C 39/024
                                                  705/26.41
2016/0189170 A1 *  6/2016  Nadler ............ G06Q 30/015
                                                  705/26.1
(Continued)

FOREIGN PATENT DOCUMENTS

EP    3474183 A1    4/2019
EP    4053812 A1 *  9/2022    ....... G08B 13/19615
(Continued)

OTHER PUBLICATIONS

EESR—Extended European Search Report dated Feb. 6, 2024 for corresponding European Patent Application No. 23202102.2 [7 pages].

*Primary Examiner* — Helen Shibru
(74) *Attorney, Agent, or Firm* — Fujitsu Intellectual Property Center

(57) ABSTRACT

A non-transitory computer-readable recording medium stores an alert output program for causing a computer to execute a process including: acquiring a video of an inside of a store where products are arranged; specifying, from the acquired video, a first region that includes the products, a second region that includes a person of interest who is to purchase the products, and a relationship in which an interaction between the products and the person is identified, by analyzing the video; determining, when the relationship satisfies a predetermined condition, whether or not a motion carried out with respect to the products included in the first region by the person included in the second region has an anomaly, based on the relationship; and outputting an alert that indicates that a person who makes an anomalous motion with respect to the products has appeared, when the motion is determined to have the anomaly.

8 Claims, 16 Drawing Sheets

(51) Int. Cl.
*G06T 7/70* (2017.01)
*G06V 10/25* (2022.01)
*G06V 10/764* (2022.01)
*G06V 40/20* (2022.01)

(52) U.S. Cl.
CPC ............ *G06V 10/764* (2022.01); *G06V 40/20* (2022.01); *G06T 2207/30196* (2013.01); *G06V 2201/07* (2022.01)

(58) Field of Classification Search
USPC ........................................................ 348/143
See application file for complete search history.

(56) References Cited

U.S. PATENT DOCUMENTS

| | | | | |
|---|---|---|---|---|
| 2022/0114647 A1* | 4/2022 | Bronicki | .............. | G06Q 20/204 |
| 2022/0122084 A1 | 4/2022 | Bronicki | | |
| 2022/0270455 A1 | 8/2022 | Uchida et al. | | |
| 2022/0292560 A1* | 9/2022 | Puthran | .............. | G06Q 30/0613 |
| 2023/0267487 A1* | 8/2023 | Kohata | ................ | G06Q 30/015 |
| | | | | 705/7.33 |
| 2024/0193993 A1* | 6/2024 | Ishida | .................... | G06V 20/52 |
| 2024/0203125 A1* | 6/2024 | Kohata | .................... | G06T 7/70 |
| 2024/0212352 A1* | 6/2024 | Jo | ........................ | G06Q 20/206 |
| 2024/0428592 A1* | 12/2024 | Miyahara | ............... | G06V 40/20 |

FOREIGN PATENT DOCUMENTS

| | | | | |
|---|---|---|---|---|
| EP | 4125059 A1 * | 2/2023 | ............. | G06V 10/82 |
| EP | 4383167 A1 * | 6/2024 | ............. | G06Q 20/18 |
| JP | 2022-165483 | 11/2022 | | |
| JP | 7276535 B1 * | 5/2023 | ......... | G06Q 30/0281 |
| JP | 7315048 B1 * | 7/2023 | ........... | G07G 1/0036 |

* cited by examiner

COMPUTER-READABLE RECORDING MEDIUM STORING ALERT OUTPUT PROGRAM, ALERT OUTPUT METHOD, AND INFORMATION PROCESSING DEVICE

CROSS-REFERENCE TO RELATED APPLICATION

This application is based upon and claims the benefit of priority of the prior Japanese Patent Application No. 2022-204996, filed on Dec. 21, 2022, the entire contents of which are incorporated herein by reference.

FIELD

The embodiments discussed herein are related to an alert output program, an alert output method, and an information processing device.

BACKGROUND

In stores such as supermarkets and convenience stores, self-checkout cash registers are becoming popular. The self-checkout cash register is a point of sale (POS) cash register system in which a user who purchases a product performs every part from reading of a barcode to checkout of the product all alone. For example, by introducing the self-checkout cash register, improvement of labor shortages due to population decrease and suppression of labor costs may be implemented. In addition, there is an approach using a machine learning model to extract a bounding box (Bbox) enclosing a region including an object or a person in a rectangular shape from a video.

Japanese Laid-open Patent Publication No. 2022-165483 is disclosed as related art.

SUMMARY

According to an aspect of the embodiments, a non-transitory computer-readable recording medium stores an alert output program for causing a computer to execute a process including: acquiring a video of an inside of a store where products are arranged; specifying, from the acquired video, a first region that includes the products, a second region that includes a person of interest who is to purchase the products, and a relationship in which an interaction between the products and the person is identified, by analyzing the video; determining, when the relationship satisfies a predetermined condition, whether or not a motion carried out with respect to the products included in the first region by the person included in the second region has an anomaly, based on the relationship; and outputting an alert that indicates that a person who makes an anomalous motion with respect to the products has appeared, when the motion is determined to have the anomaly.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

However, since a positional relationship between Bboxes extracted from a video is based on a two-dimensional space, for example, a depth between the Bboxes may not be analyzed, and it is difficult to identify a relationship between a person and an object. In addition, since scanning of a product code and checkout are wholly entrusted to a user, the self-checkout cash register described above has an aspect that it is difficult to suppress shoplifting in the store.

In one aspect, an object is to provide an alert output program, an alert output method, and an information processing device capable of suppressing shoplifting in a store.

Hereinafter, embodiments of an alert output program, an alert output method, and an information processing device disclosed in the present application will be described in detail with reference to the drawings. Note that these embodiments do not limit the embodiments. In addition, the embodiments can be appropriately combined with each other unless otherwise contradicted.

First Embodiment

1. Overall Configuration

Figure 1:
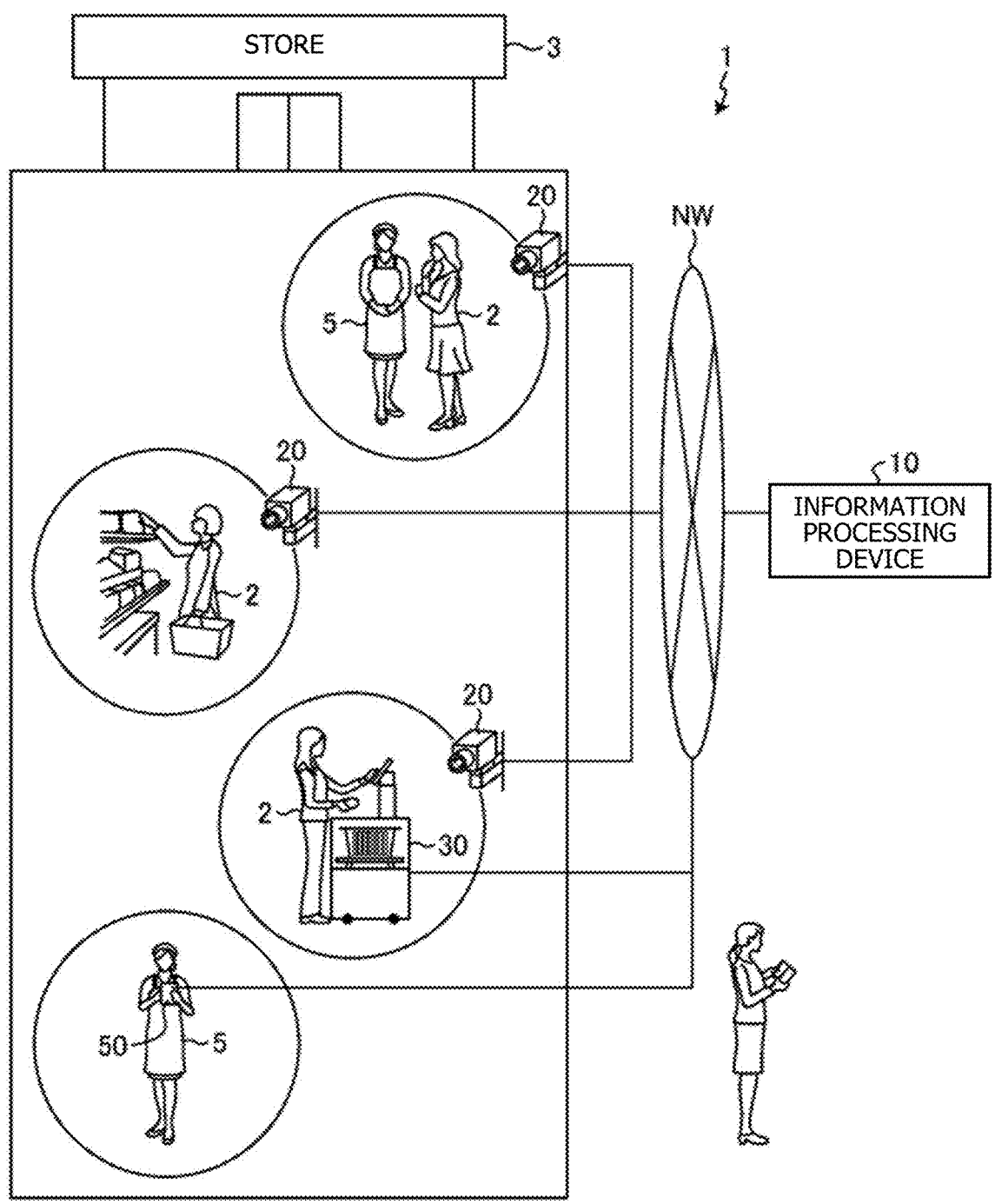
FIG. 1 is a diagram illustrating a configuration example of a system.

FIG. 1 is a diagram illustrating a configuration example of a system. A system 1 illustrated in FIG. 1 is configured to provide an alert output function that outputs an alert when fraud is detected using a video captured in a store 3 such as a supermarket or a convenience store.

As illustrated in FIG. 1, the system 1 can include an information processing device 10, cameras 20, a self-checkout cash register 30, and a store clerk terminal 50. These information processing device 10, cameras 20, self-checkout cash register 30, and store clerk terminal 50 are coupled via a network NW. For example, the network NW may be various communication networks regardless of wired or wireless communication networks.

The information processing device 10 is an example of a computer that provides the above alert output function. For example, by implementing the information processing device 10 as a platform as a service (PaaS) type or software as a service (SaaS) type application, the information processing device 10 can provide the above alert output function as a cloud service. Additionally, the information processing device 10 can also be implemented as a server that provides the above alert output function on-premises.

The camera 20 is an example of an imaging device that captures a video. The camera 20 is installed so as to be able to capture a specified range in the store 3, such as an area including a selling space of products, a store shelf of products, or the self-checkout cash register 30 installed in a checkout zone. This enables to capture, as an example, a composition in which a store clerk 5 serves a customer 2, a composition in which the customer 2 makes motions near, for example, a store shelf for products, a composition in which the customer 2 makes a checkout at the self-checkout cash register 30, or the like.

The data of the video captured by the camera 20 in this manner is transmitted to the information processing device 10. For example, the data of the video includes a plurality of time-series image frames. Frame numbers are assigned to each image frame in an ascending order of time series. One image frame is image data of a still image captured by the camera 20 at a certain timing. Hereinafter, the data of the video will be sometimes expressed by mentioning "video data".

The self-checkout cash register 30 is an example of an accounting machine with which a customer who is to purchase a product performs registration to a cash register and checkout (payment) of the product to be purchased all alone. The self-checkout cash register 30 is referred to as a "self checkout", an "automated checkout", a "self-checkout machine", a "self-checkout register", or the like. For example, when the customer 2 moves a product intended to be purchased to a scan area of the self-checkout cash register 30, the self-checkout cash register 30 scans a code printed or attached to the product and registers the product intended to be purchased.

The customer 2 repeatedly executes the above registration action to the cash register and, when scanning of the products is completed, operates a touch panel or the like of the self-checkout cash register 30 to make a checkout request. When accepting the checkout request, the self-checkout cash register 30 presents the number of products intended to be purchased, a purchase amount, and the like and executes checkout processing. The self-checkout cash register 30 registers information on the products scanned during an interval from the start of scanning until the checkout request is made by the customer 2, in a storage unit, and transmits the registered information to the information processing device 10 as self-checkout cash register data (product information).

The store clerk terminal 50 is a terminal device used by the store clerk 5. As one aspect, the store clerk terminal 50 functions as a client that receives provision of the alert output function mentioned above. For example, the store clerk terminal 50 may be implemented by a portable terminal device, a wearable terminal, or the like. This is merely an example, and the store clerk terminal 50 may be implemented by any computer such as a desktop or laptop personal computer.

In such a configuration, the information processing device 10 acquires a video of the inside of the store where the products are arranged. Then, by analyzing the acquired video, the information processing device 10 specifies, from the video, a first region including a product, a second region including a person of interest who is to purchase the product, and a relationship in which an interaction between the product and the person is identified. Thereafter, when the relationship satisfies a predetermined condition, the information processing device 10 determines whether or not the motion carried out with respect to the product included in the first region by the person included in the second region is anomalous, based on the relationship and, when the motion is determined to be anomalous, outputs an alert indicating that a person making an anomalous motion with respect to a product has appeared.

As one aspect, this may enable to detect an anomaly and output an alert at the time of specifying grabbing or the like over a plurality of times, as a relationship between a customer and a product not suited for bulk buying.

Consequently, shoplifting in the store may be suppressed.

2. Functional Configuration

Figure 2:
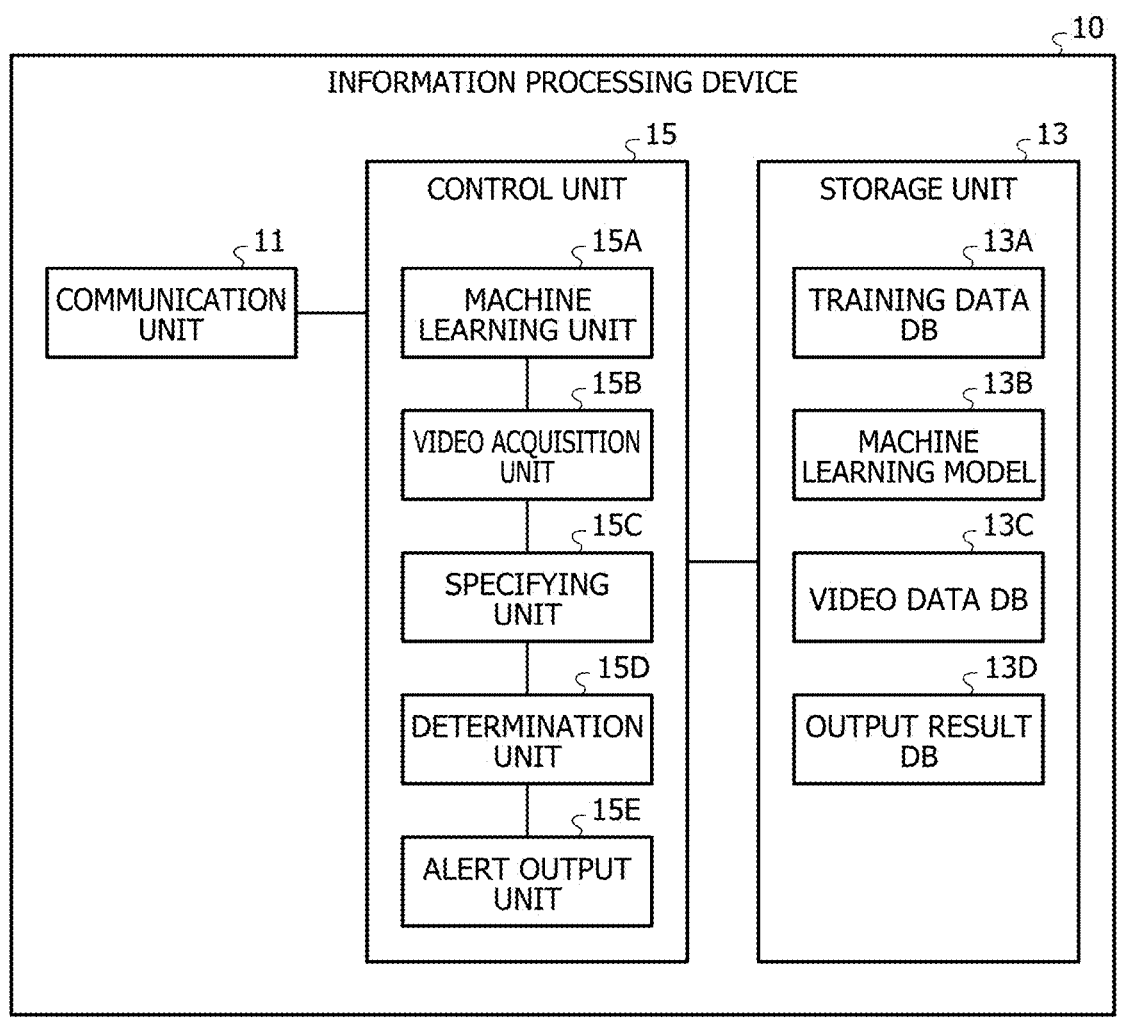
FIG. 2 is a block diagram illustrating a functional configuration example of an information processing device.

FIG. 2 is a block diagram illustrating a functional configuration example of the information processing device 10. As illustrated in FIG. 2, the information processing device 10 includes a communication unit 11, a storage unit 13, and a control unit 15.

2-1. Communication Unit

The communication unit 11 is a processing unit that controls communication with another device and, for example, is implemented by a communication interface or the like. For example, the communication unit 11 receives video data from the cameras 20 and transmits a processing result by the control unit 15 to the store clerk terminal 50 or the like.

2-2. Storage Unit

The storage unit 13 is a processing unit that stores various types of data, programs to be executed by the control unit 15, and the like and, for example, is implemented by a memory, a hard disk, or the like. The storage unit 13 stores a training data database (DB) 13A, a machine learning model 13B, a video data DB 13C, and an output result DB 13D.

<2-2-1. Training Data DB>

Figure 3:
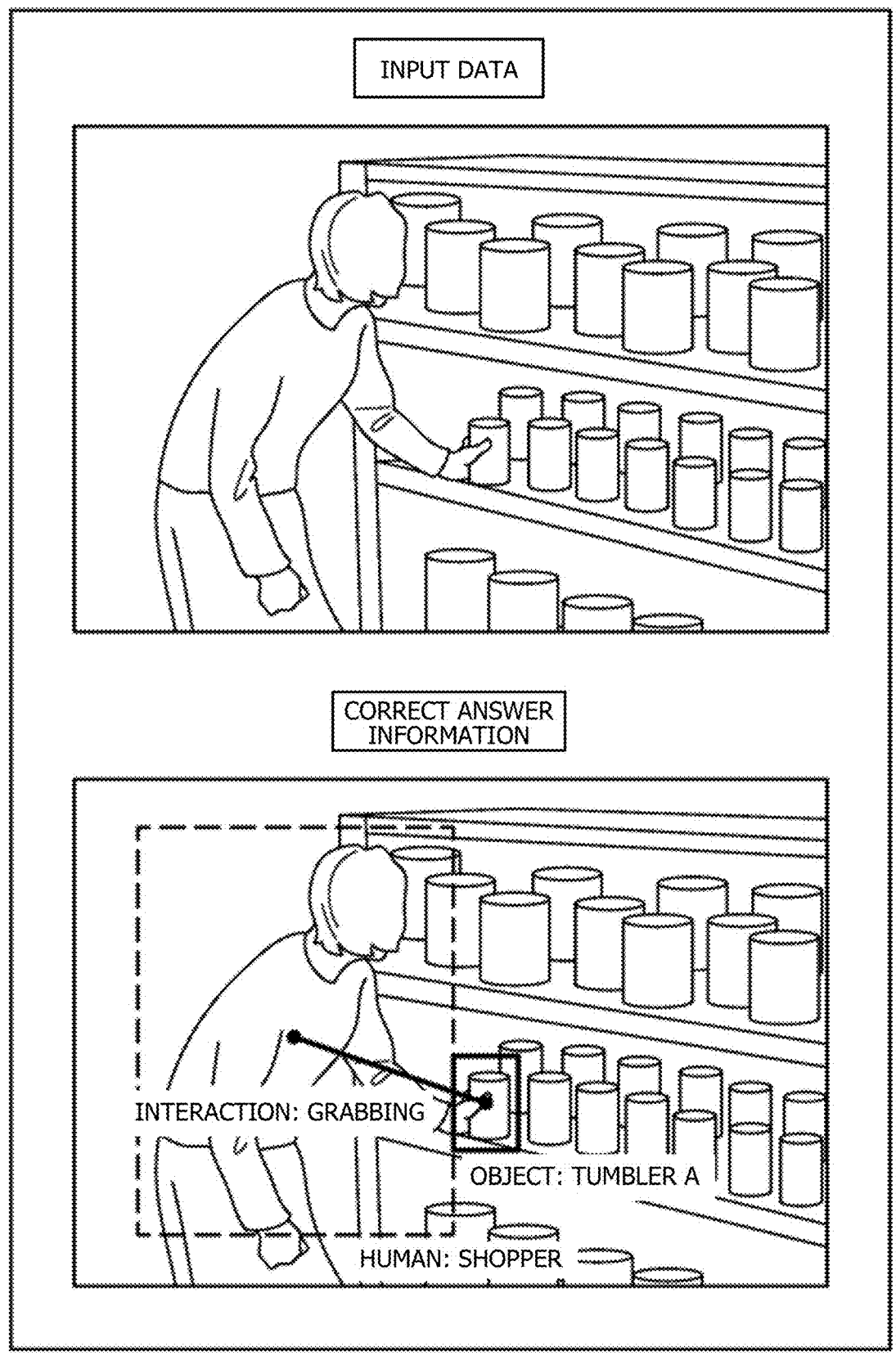
FIG. 3 is a diagram explaining training data of a machine learning model.

The training data DB 13A is a database that stores data used to train the machine learning model 13B that detects a human, an object, and a relationship between human and object. For example, an example in which human object interaction detection (HOID) is adopted for the machine learning model 13B will be described with reference to FIG. 3. FIG. 3 is a diagram explaining training data of the machine learning model 13B. As illustrated in FIG. 3, each piece of the training data includes image data serving as input data and correct answer information set for the image data.

In the correct answer information, classes of the human and the object intended to be detected, a class indicating an interaction between the human and the object, and a bounding box (Bbox: region information on an object) indicating the region of each class are set. For example, a class indicating an item name "tumbler A" that identifies the item of the product, a class "shopper" indicating a person of interest who is to purchase the product, such as the customer 2, region information on the object and the human, and a relationship "grabbing" indicating an interaction between the object and the human are set as the correct answer information. Note that a class label for negative examples, such as "other than shoppers" as an example, can be set for a person other than the person of interest who is to purchase the product, such as the store clerk 5.

Here, the item name is given as a mere example of the class of the object, but the class set in the object may be a Something class indicating an object such as the product other than a plastic shopping bag. Usually, when the Something class is created in normal object identification (object recognition), all objects that are not related to a task, such as all backgrounds, clothes, and accessories, will be detected. Furthermore, since these objects are all regarded as Something, only a large number of Bboxes are identified in the image data, and nothing is known. In the case of the HOID, since it may be known that there is a special relationship that the object is held by the human (there are cases of other relationships such as sitting or operating), the relationship can be used as meaningful information for a task (for example, a fraud detection task of the self-checkout cash register). After the objects are detected as Something, the plastic shopping bag or the like is identified as a unique class of Bag (plastic shopping bag). This plastic shopping bag provides valuable information in the fraud detection task of the self-checkout cash register, but is not important information in another task. Thus, it is valuable to use the plastic shopping bag, based on unique knowledge in the fraud detection task of the self-checkout cash register that a product is taken out from a basket (shopping basket) and accommodated in the bag, and a useful effect may be obtained.

<2-2-2. Machine Learning Model>

Returning to FIG. 2, the machine learning model 13B indicates a machine learning model used for the fraud detection task of the self-checkout cash register 30. The machine learning model 13B may be implemented by the HOID described above, merely as an example. Hereinafter, the machine learning model implemented by the HOID will be sometimes expressed by mentioning a "HOID model". In these circumstances, the machine learning model 13B identifies a human, a product, and a relationship between the human and the product from input image data and outputs an identification result. For example, "the class and the region information of the human, the class and the region information of the product (object), an interaction between the human and the product" are output. Note that an example in which the machine learning model 13B is implemented by the HOID will be given here, but the machine learning model 13B may be implemented by a machine learning model using various neural networks or the like.

<2-2-3. Video Data DB>

The video data DB 13C is a database that stores video data captured by the camera 20 installed so as to be able to capture an area including a selling space of products, a store shelf for products, or the self-checkout cash register 30 installed in a checkout zone. For example, the video data DB 13C stores, for each camera 20, image data or the like acquired from the camera 20 in units of frames.

<2-2-4. Output Result DB>

The output result DB 13D is a database that stores an output result output by the HOID model 13B to which the video data captured by the camera 20 has been input. For example, the output result DB 13D stores, for each camera 20, the output result and the like of the HOID in which the image data acquired from the camera 20 has been input to the HOID model 13B, in units of frames.

2-3. Control Unit

The control unit 15 is a processing unit that takes overall control of the information processing device 10 and, for example, is implemented by a processor or the like. This control unit 15 includes a machine learning unit 15A, a video acquisition unit 15B, a specifying unit 15C, a determination unit 15D, and an alert output unit 15E. Note that the machine learning unit 15A, the video acquisition unit 15B, the specifying unit 15C, the determination unit 15D, and the alert output unit 15E are implemented by an electronic circuit included in a processor, a process executed by the processor, or the like.

<2-3-1. Machine Learning Unit>

Figure 4:
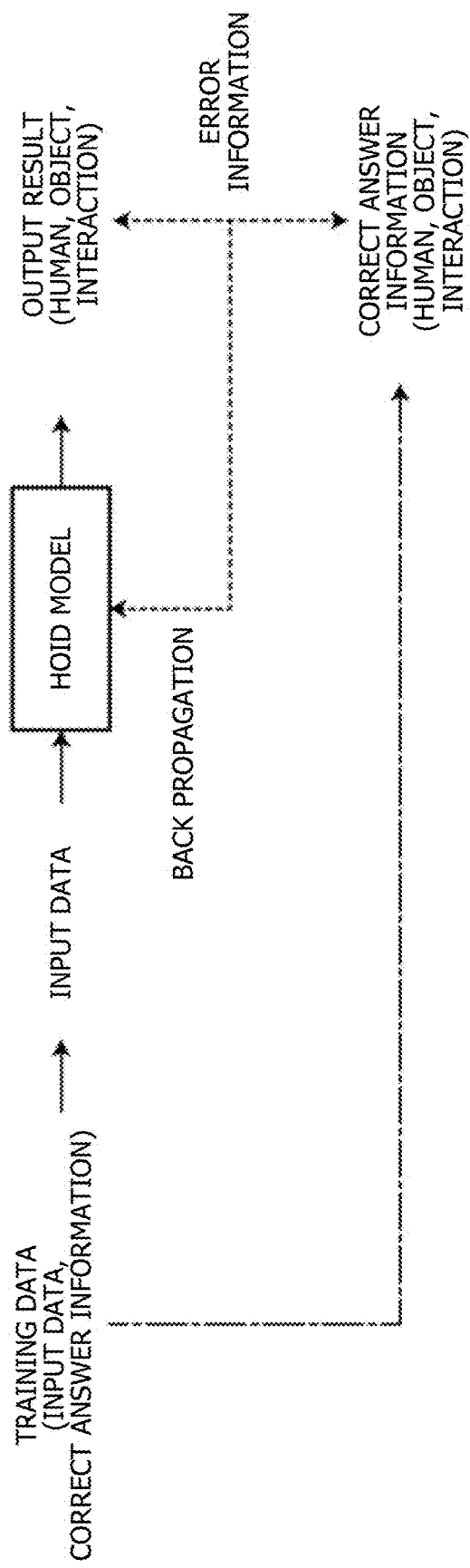
FIG. 4 is a schematic diagram illustrating a training example of a human object interaction detection (HOID) model.

The machine learning unit 15A is a processing unit that executes machine learning of the machine learning model 13B. As one aspect, the machine learning unit 15A executes machine learning of the HOID model that is an example of the machine learning model 13B, using each piece of training data stored in the training data DB 13A. FIG. 4 is a schematic diagram illustrating a training example of the HOID model. As illustrated in FIG. 4, the machine learning unit 15A inputs input data of the training data to the HOID model and acquires an output result of the HOID model. This output result includes the class of the human, the class of the object, an interaction between the human and the object, and the like detected by the HOID model. Then, the machine learning unit 15A calculates error information between the correct answer information on the training data and the output result of the HOID model and executes machine learning of the HOID model by back propagation so as to reduce the error. This generates a trained HOID model. The trained HOID model generated in this manner is stored in the storage unit 13 as the machine learning model 13B.

<2-3-2. Video Acquisition Unit>

Returning to the description of FIG. 2, the video acquisition unit 15B is a processing unit that acquires video data from the camera 20. For example, the video acquisition unit 15B acquires video data from each camera 20 installed in the store 3 for each camera 20 at any cycle, for example, in units of frames. Thereafter, the video acquisition unit 15B stores the image data of each frame in the video data DB 13C for each frame.

<2-3-3. Specifying Unit>

The specifying unit 15C is a processing unit that, by analyzing the video data acquired by the video acquisition unit 15B, specifies, from the video, the first region including a product, the second region including a person of interest who is to purchase the product, and a relationship in which an interaction between the product and the person is identified.

Figure 5:
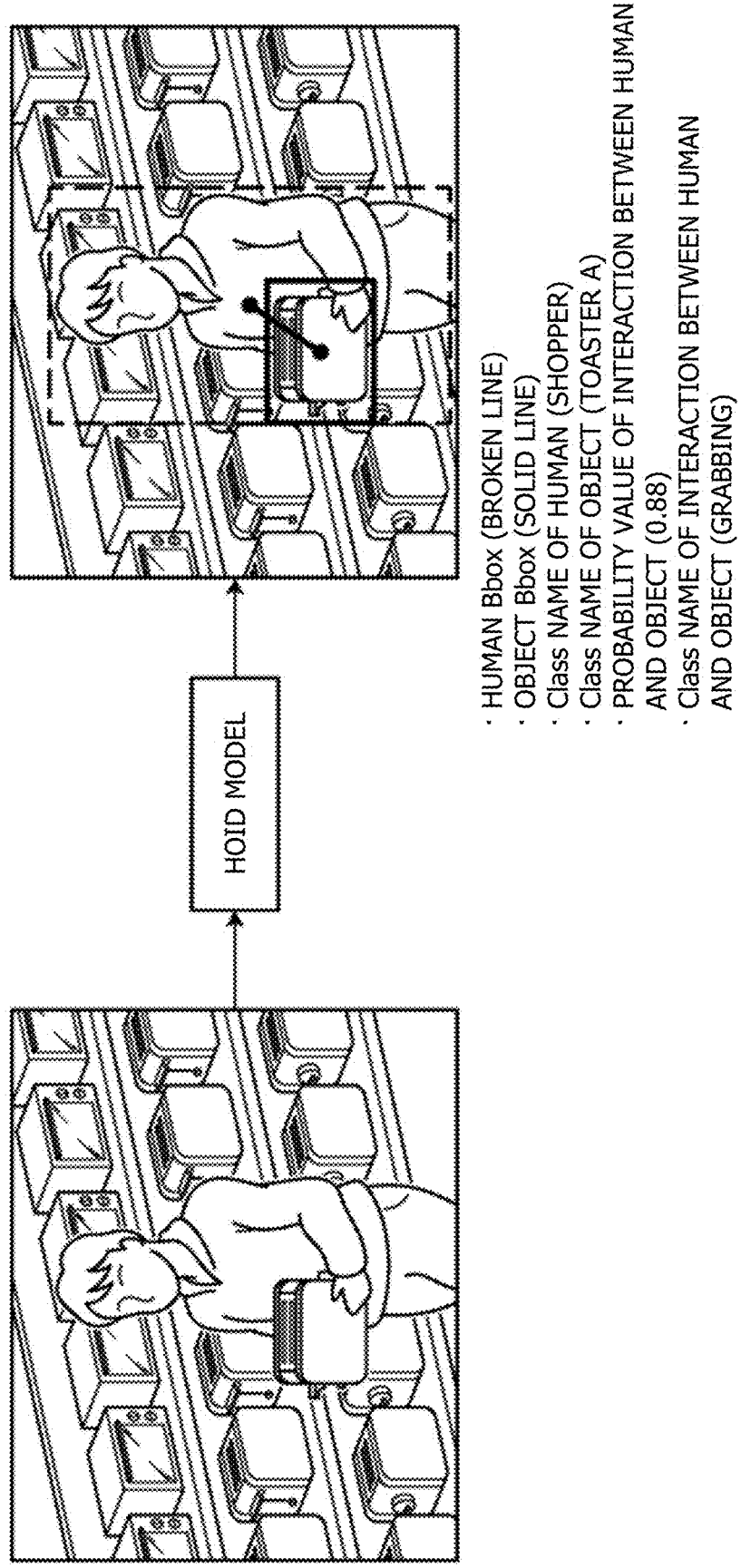
FIG. 5 is a diagram illustrating an output example of the HOID model.

For example, when image data of a new frame is acquired, the specifying unit 15C inputs the image data to the machine learning model 13B such as the HOID model and acquires an output result of the HOID model. Such an output result of the HOID model can include the class of the object corresponding to the first region, the class of the human corresponding to the second region, the class indicating an interaction between the human and the object, and the Bboxes indicating the region of each class. FIG. 5 is a diagram illustrating an output example of the HOID model. FIG. 5 depicts image data that is input data to the HOID model and an output result of the HOID model. In FIG. 5, the human Bbox is indicated by the broken line frame, while the object Bbox is indicated by the solid line frame. As illustrated in FIG. 5, the output result of the HOID model includes the Bbox of a human "shopper", the Bbox of an object "toaster A", a probability value "0.88" and a class name "grabbing" of an interaction between the human and the object, and the like. Thereafter, the specifying unit 15C stores the output result of the HOID regarding the image data of the new frame in the output result DB 13D.

<2-3-4. Determination Unit>

The determination unit 15D is a processing unit that determines whether or not the motion of a human with respect to a product is anomalous, based on the relationship between the human and the object specified by the specifying unit 15C. As one aspect, when the item of the product specified by the specifying unit 15C is a predetermined product, the determination unit 15D determines that a person making an anomalous motion with respect to the product has appeared, based on the number of times the person makes motions of grabbing the product.

Merely as an example, the determination unit 15D executes processing as follows in units of frames of image data. That is, the determination unit 15D acquires the output result of the HOID model corresponding to the new frame among the output results of the HOID model stored in the output result DB 13D. Then, depending on whether or not the output result of the HOID model satisfies the determination conditions listed below, the determination unit 15D determines whether or not the customer 2 is performing anomalous motions of grabbing a product not suited for a bulk buying over a plurality of times.

Hereinafter, a product not suited for a bulk buying will be sometimes expressed by mentioning a "bulk-buying unsuitable product". Merely as one aspect, such a "bulk-buying unsuitable product" refers to a product that is unlikely to purchase a plurality of products per household, and to give examples of electrical appliances, a refrigerator, a microwave oven, a toaster, and the like can be mentioned.

As the first one of the above-mentioned determination conditions, the condition that the class of an interaction indicating a relationship between a human and an object is "grabbing" is imposed as a condition 1. As a second condition, the condition that the class of the object falls under the "bulk-buying unsuitable product" is imposed as a condition 2. As a third condition, the condition that the classes of the human, the object, and the interaction are not consistent between frames is imposed as a condition 3. This is a condition for determining a turning point of the motion of grabbing the bulk-buying unsuitable product, such as a timing at which the grabbing motion is started. As a fourth condition, the condition that the cumulative number of times of grabbing motions on the same type of bulk-buying unsuitable products by the same person is equal to or more than a threshold value is imposed as a condition 4. The "same type" mentioned here refers to, as one aspect, having a common category such as a common kind of products or a common sort of articles, and the item names of products do not necessarily have to be the same.

In more detail, the determination unit 15D determines whether or not the class of the interaction indicating the relationship between the human and the object, which is included in the output result of the HOID model, is "grabbing" (condition 1). At this time, when the class of interaction is "grabbing", the determination unit 15D further determines whether or not the class of the object included in the output result of the HOID model falls under the "bulk-buying unsuitable product" (condition 2). Then, when the class of the object falls under the "bulk-buying unsuitable product", the determination unit 15D executes determination as follows. That is, the determination unit 15D determines whether or not the classes of the human, object, and interaction obtained as the output result of the HOID model corresponding to the new frame are consistent with the classes of the human, object, and interaction obtained as the output result of the HOID model corresponding to the one preceding frame (condition 3).

Here, when the classes of the human, object, and interaction are not consistent between the frames, it is found that the new frame corresponds to the timing at which the grabbing motion on the bulk-buying unsuitable product is started. In these circumstances, the determination unit 15D extracts, from the output result DB 13D, a history of the output results of the HOID model regarding the same person as the customer 2 detected in the new frame, using a partial image of the image data of the new frame corresponding to the Bbox of the human "shopper".

For example, for each output result of the HOID model included in the output result DB, the determination unit 15D calculates similarity between a face image included in the Bbox of the human "shopper" of each output result and a face image included in the Bbox of the human "shopper" detected in the new frame and extracts a history of output results of the HOID model having the similarity equal to or higher than a threshold value. Note that an example in which the history of the same person is extracted by collation of face images has been given here, but the history of the same person may be extracted by executing tracking in accordance with an algorithm such as multiple-object tracking (MOT).

Based on the output results of the HOID model extracted in this manner, the determination unit 15D calculates the cumulative number of times of grabbing motions on the same type of bulk-buying unsuitable products by the same person as the customer 2 detected in the new frame.

Figure 6:
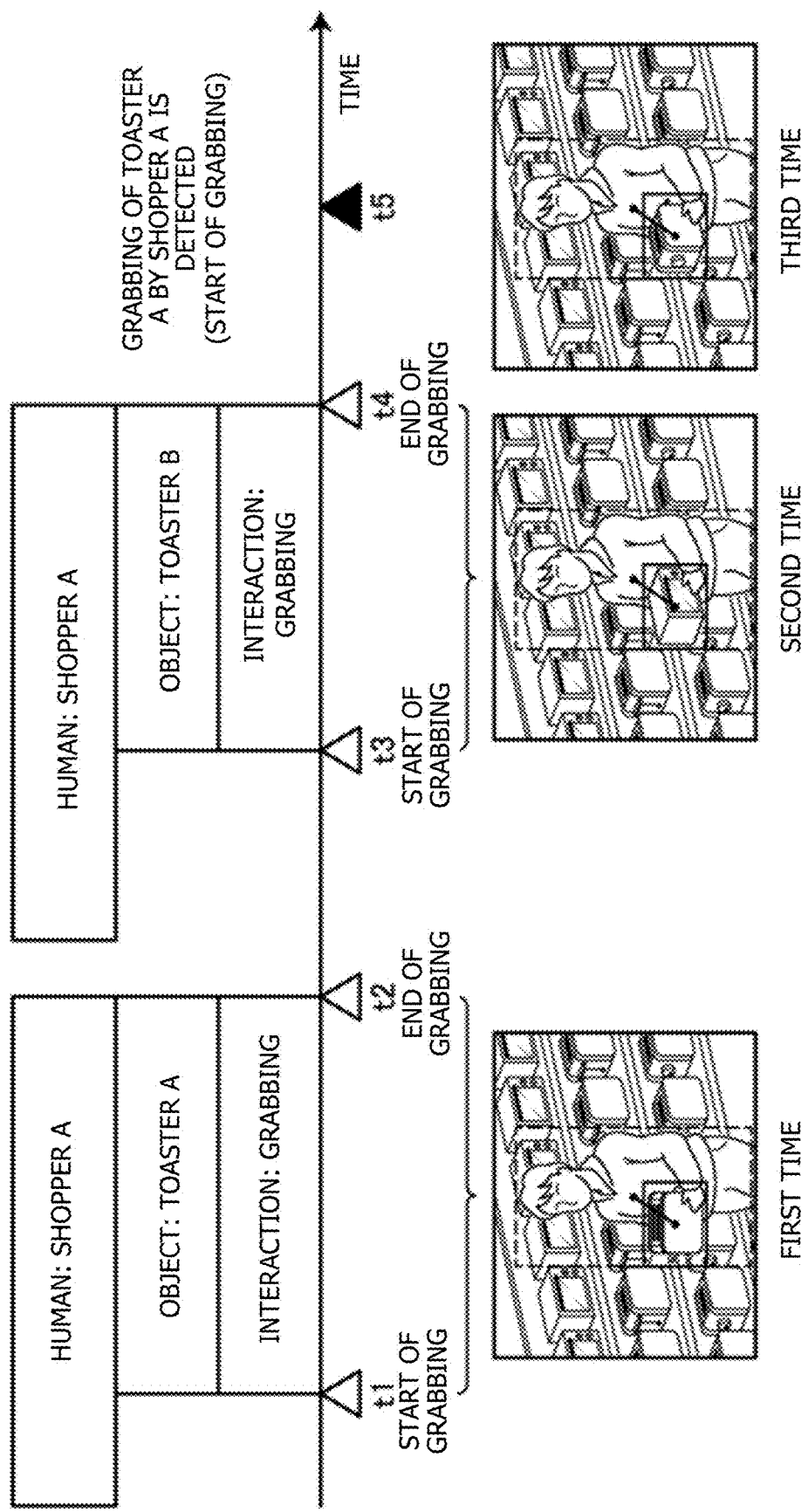
FIG. 6 is a schematic diagram illustrating an example of a history of output results of the HOID model.

FIG. 6 is a schematic diagram illustrating an example of a history of output results of the HOID model. FIG. 6 illustrates an excerpt of a history of output results of the HOID model regarding the customer "shopper A" detected in the new frame. Furthermore, in FIG. 6, the human Bbox is indicated by the broken line frame, while the object Bbox is indicated by the solid line frame.

As illustrated in FIG. 6, the determination unit 15D specifies a frame section in which the face image included in the partial image of the human Bbox is similar to the face image of the customer "shopper A" detected in the new frame, the class of the object is the same type as the class of the bulk-buying unsuitable product "toaster A" detected in the new frame, the class of interaction is "grabbing", and the same classes of the object, human, and interaction continue.

In the state of the example illustrated in FIG. 6, a frame is detected for the first time at a time t1 in which the face image included in the partial image of the human Bbox is similar to the face image of the customer "shopper A", the class of the object is the bulk-buying unsuitable product "toaster A" that is the same as the bulk-buying unsuitable product "toaster A" detected in the new frame, and the class of interaction is "grabbing". Therefore, it can be identified that the grabbing of the bulk-buying unsuitable product by the customer "shopper A" at the first time is started at the time t1. The same classes of the object, human, and interaction then continue until a time t2. Thus, it can be identified that the grabbing of the bulk-buying unsuitable product by the customer "shopper A" at the first time is ended at the time t2. This specifies the frame section from the time t1 to the time t2 as the first time of the grabbing motion on the bulk-buying unsuitable product by the customer "shopper A".

Next, a frame is detected for the second time at a time t3 in which the face image included in the partial image of the human Bbox is similar to the face image of the customer "shopper A", the class of the object is the bulk-buying unsuitable product "toaster B" that is of the same type as the bulk-buying unsuitable product "toaster A" detected in the new frame, and the class of interaction is "grabbing". Therefore, it can be identified that the grabbing of the bulk-buying unsuitable product by the customer "shopper A" at the second time is started at the time t3. The same classes of the object, human, and interaction then continue until a time t4. Thus, it can be identified that the grabbing of the bulk-buying unsuitable product by the customer "shopper A" at the second time is ended at the time t4. This specifies the frame section from the time t3 to the time t4 as the second time of the grabbing motion on the bulk-buying unsuitable product by the customer "shopper A". After that, the grabbing motion of the bulk-buying unsuitable product by the customer "shopper A" is not detected until the new frame.

As a result, the determination unit 15D specifies a total of three times of the frame section from the time t1 to the time t2, the frame section from the time t3 to the time t4, and the new frame, as the summed number of times of grabbing motions on the bulk-buying unsuitable product by the customer "shopper A".

Thereafter, the determination unit 15D determines whether or not the summed number of times of grabbing motions on the bulk-buying unsuitable product by the same person as the customer 2 detected in the new frame is equal to or more than a threshold value such as three times (condition 4). At this time, when the summed number of times of grabbing motions on the bulk-buying unsuitable product by the same person is equal to or more than the threshold value, the grabbing motions can be detected as an anomalous motion with respect to the product. For example, in the state of the example illustrated in FIG. 6, an anomalous motion in which the customer "shopper A" carries toasters that are products not suited for bulk buying even over three times can be detected.

Here, another method for detecting an anomalous motion by the customer 2 will be described. By inputting the acquired video to the machine learning model (HOID model), the specifying unit 15C specifies the first region, the second region, and the class indicating a relationship between the first region and the second region for a person (customer) and a product (bulk-buying unsuitable product) in the video. Then, the specifying unit 15C specifies a period in which the class indicating grabbing continues for the specified class of the relationship. The specifying unit 15C tracks the motion of the person grabbing the product, based on the period in which the class indicating grabbing continues. Then, the determination unit 15D determines whether or not the motion carried out with respect to the product included in the first region by the person included in the second region is anomalous, based on the time length of the tracked motion of grabbing the product. In other words, the determination unit 15D determines that the person is making an anomalous motion with respect to the product, based on the time length of the motion of grabbing the product by the person, which is specified from the period in which the class indicating grabbing continues. For example, when the period of time of the motion of grabbing the product by the person is shorter than a predetermined time length and the motions shorter than the predetermined time length have been repeatedly executed until the summed number of times is equal to or more than a threshold value, the determination unit 15D determines that the person is making an anomalous motion with respect to the product. The determination unit 15D detects that the frame section from the time t1 to the time t2 is shorter than the predetermined time length, the frame section from the time t3 to the time t4 is shorter than the predetermined time length, and the new frame section is shorter than the predetermined time length. This allows the determination unit 15D to detect an anomalous motion of carrying toasters that are products not suited for bulk buying consecutively even over three times in a short period.

<2-3-5. Alert Output Unit>

The alert output unit 15E is a processing unit that outputs an alert to output destinations including the store clerk terminal 50 and the like.

Figure 7:
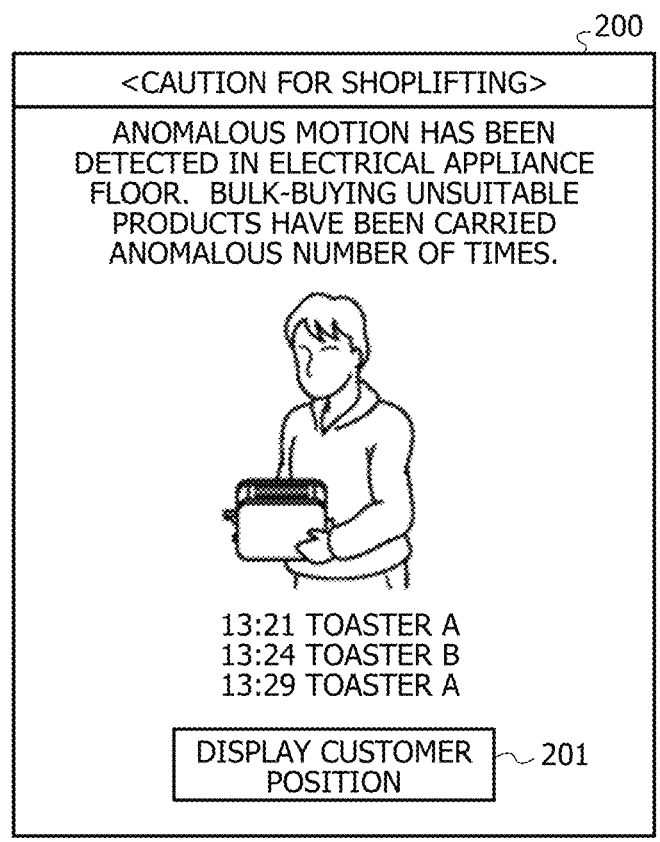
FIG. 7 is a diagram illustrating an output example of an alert.

Merely as an example, when the determination unit 15D determines that there is an anomaly, the alert output unit 15E can output an alert indicating that the customer 2 who is likely to shoplift the bulk-buying unsuitable product has appeared, to the store clerk terminal 50. FIG. 7 is a diagram illustrating an output example of an alert. FIG. 7 illustrates an alert screen 200 regarding an anomalous motion of the customer "shopper A" illustrated in FIG. 6. As illustrated in FIG. 7, the alert output unit 15E can include, in the alert screen 200, an image of the customer "shopper A" who performs a grabbing motion on the bulk-buying unsuitable product, such as an image of the Bbox of the human "shopper" in the new frame. Additionally, the alert output unit 15E can include, in the alert screen 200, the number of times the grabbing motions on the bulk-buying unsuitable product have been performed, the time of each grabbing motion, and the like. With such an alert screen 200, a related person of the store 3, such as the store clerk 5, can take a measure such as caution or report, as an example, for the customer 2 before shoplifting of the bulk-buying unsuitable product.

As another example, the alert output unit 15E can output an alert indicating the position of the customer 2 performing the grabbing motion on the bulk-buying unsuitable product. For example, the alert output unit 15E can specify the position of the customer 2 in a three-dimensional space by applying image processing to the image data of the new frame. Examples of such image processing include stereo matching using image data of a plurality of the cameras 20, position detection using a marker installed in the store 3, and the like. Additionally, in a case where the camera 20 is a depth camera, the three-dimensional position can be calculated more accurately, based on the depth value of the subject of the customer 2 and the camera parameters such as external parameters and internal parameters.

Figure 8:
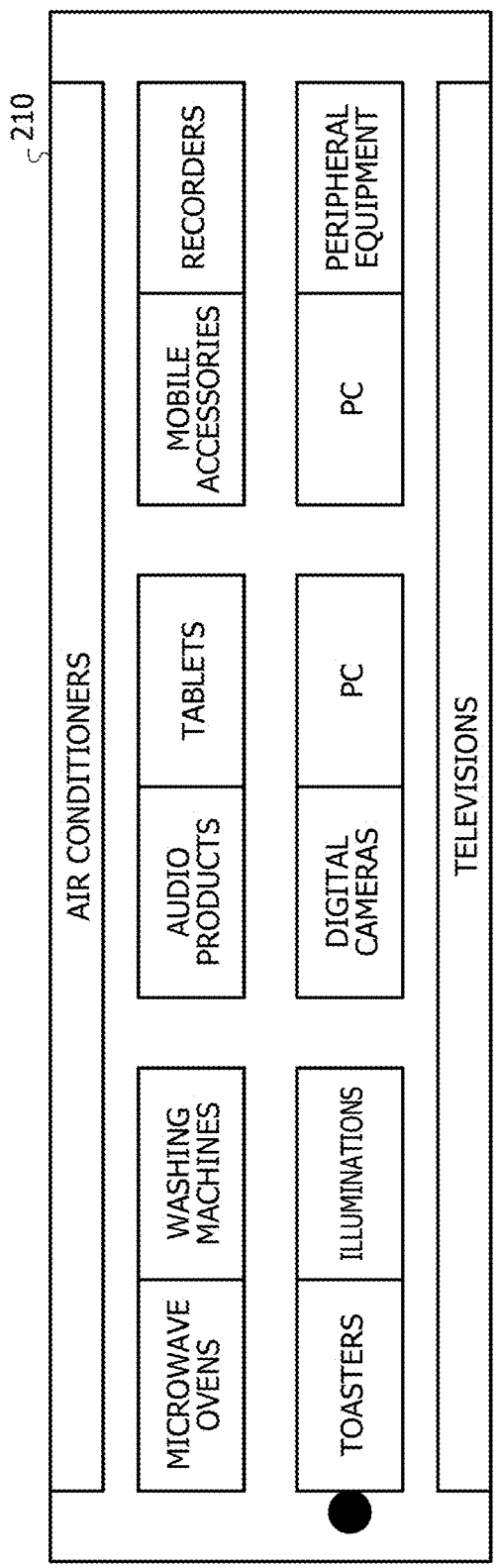
FIG. 8 is a diagram illustrating a display example of a customer position.

For example, the position of the customer 2 specified in this manner can be plotted and displayed on a map of the store 3, such as a floor map, merely as an example. FIG. 8 is a diagram illustrating a display example of a customer position. FIG. 8 illustrates a floor map of a selling space of the electrical appliances. For example, a floor map 210 illustrated in FIG. 8 can be called when an operation is performed on a graphical user interface (GUI) component 201 included in the alert screen 200 illustrated in FIG. 7. As illustrated in FIG. 8, on the floor map 210, the position of the customer "shopper A" performing the grabbing motion on the bulk-buying unsuitable product is plotted by the black circle mark. With such display of the floor map 210, a related person of the store 3, such as the store clerk 5, can quickly and effectively take a measure for the customer 2 who is likely to shoplift the bulk-buying unsuitable product.

3. Flow of Processing

Next, a flow of processing of the information processing device 10 according to the present embodiment will be described. Here, (1) video acquisition processing and (2) alert output processing executed by the information processing device 10 will be described in this order.

(1) Video Acquisition Processing

Figure 9:
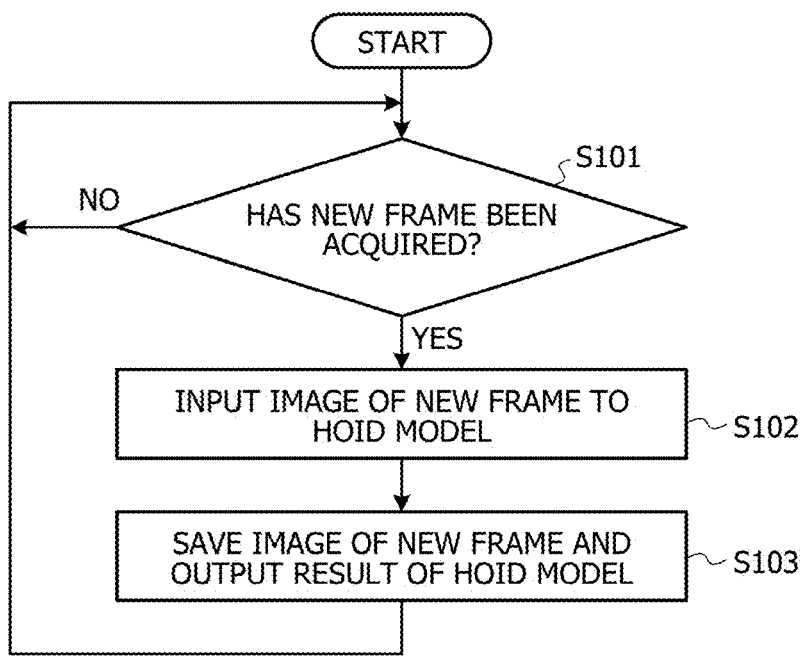
FIG. 9 is a flowchart illustrating a flow of video acquisition processing.

FIG. 9 is a flowchart illustrating a flow of the video acquisition processing. This processing is iteratively executed as long as the video data is acquired from the cameras 20, merely as an example.

As illustrated in FIG. 9, when the image data of a new frame is acquired by the video acquisition unit 15B (Yes in step S101), the specifying unit 15C inputs the image data to the machine learning model 13B such as the HOID model to acquire an output result of the HOID model (step S102).

Thereafter, the video acquisition unit 15B saves the image data of the new frame in the video data DB 13C, while the specifying unit 15C saves the output result of the HOID regarding the image data of the new frame in the output result DB 13D (step S103).

(2) Alert Output Processing

Figure 10:
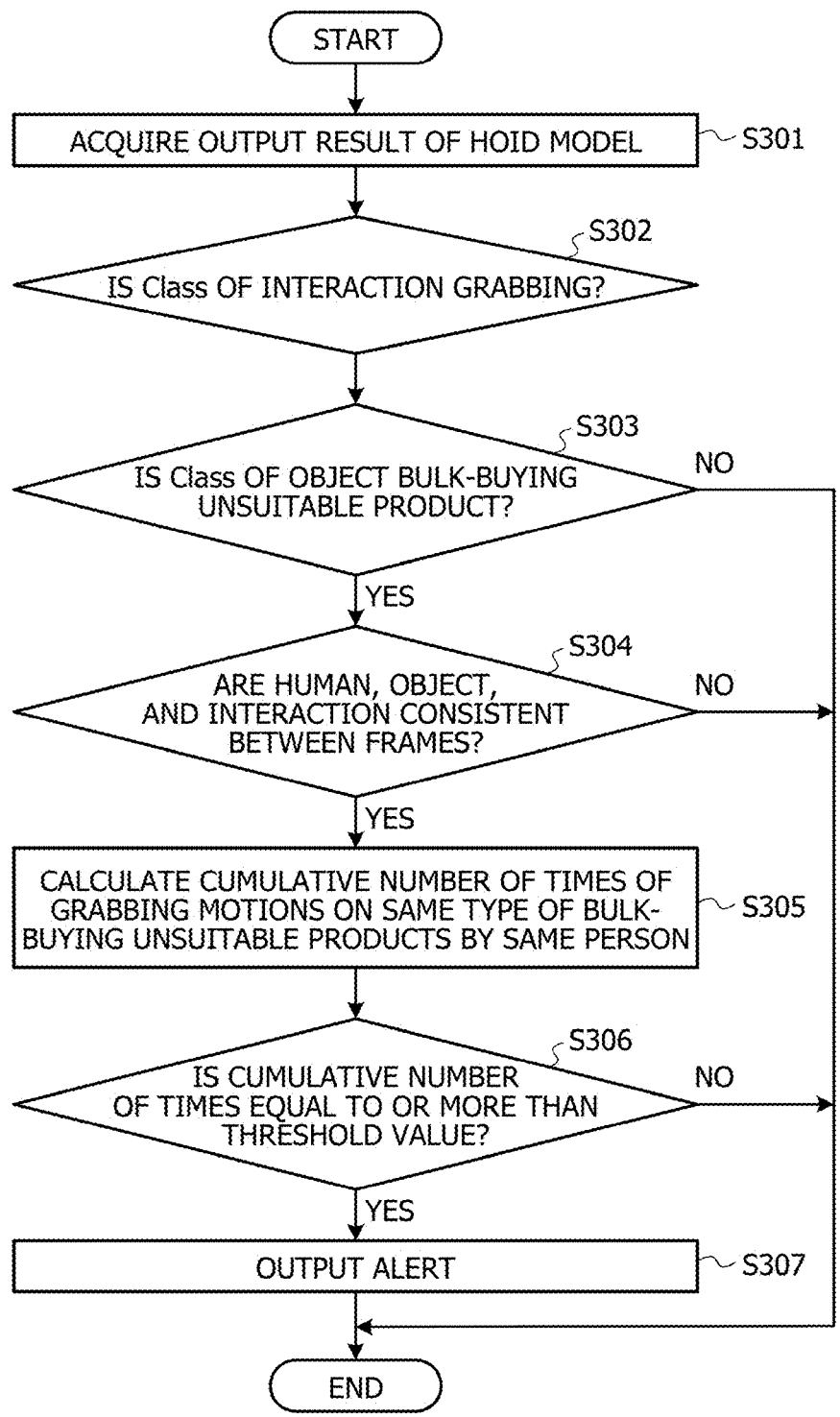
FIG. 10 is a flowchart illustrating a procedure of alert output processing.

FIG. 10 is a flowchart illustrating a procedure of the alert output processing. This processing is iteratively executed as long as the video data is acquired from the cameras 20, merely as an example.

As illustrated in FIG. 10, the determination unit 15D acquires the output result of the HOID model corresponding to the new frame among the output results of the HOID model stored in the output result DB 13D (step S301).

Then, the determination unit 15D determines whether or not the class of the interaction indicating the relationship between the human and the object, which is included in the output result of the HOID model, is "grabbing" (step S302). At this time, when the class of interaction is "grabbing" (Yes in step S302), the determination unit 15D further determines whether or not the class of the object included in the output result of the HOID model falls under the "bulk-buying unsuitable product" (step S303).

Then, when the class of the object falls under the "bulk-buying unsuitable product" (Yes in step S303), the determination unit 15D executes determination as follows. That is, the determination unit 15D determines whether or not the classes of the human, object, and interaction obtained as the output result of the HOID model corresponding to the new frame are consistent with the classes of the human, object, and interaction obtained as the output result of the HOID model corresponding to the one preceding frame (step S304).

Here, when the classes of the human, object, and interaction are not consistent between the frames (No in step S304), it is found that the new frame corresponds to the timing at which the grabbing motion on the bulk-buying unsuitable product is started. In this case, the determination unit 15D calculates the cumulative number of times of grabbing motions on the same type of bulk-buying unsuitable products by the same person, based on the history of the output results of the HOID model regarding the same person as the customer 2 detected in the new frame (step S305).

Thereafter, the determination unit 15D determines whether or not the summed number of times of grabbing motions on the bulk-buying unsuitable product by the same person as the customer 2 detected in the new frame is equal to or more than a threshold value such as three times (step S306).

At this time, when the summed number of times of grabbing motions on the bulk-buying unsuitable product by the same person is equal to or more than the threshold value (Yes in step S306), the grabbing motions can be detected as an anomalous motion with respect to the product. In this case, the alert output unit 15E outputs an alert indicating that the customer 2 who is likely to shoplift the bulk-buying unsuitable product has appeared, to the store clerk terminal 50 (step S307) and ends the processing.

4. One Aspect of Effects

As described above, the information processing device 10 acquires a video of the inside of the store where the products are arranged. Then, by analyzing the acquired video, the information processing device 10 specifies, from the video, the first region including a product, the second region including a person of interest who is to purchase the product, and a relationship in which an interaction between the product and the person is identified. Thereafter, when the relationship satisfies a predetermined condition, the information processing device 10 determines whether or not the motion carried out with respect to the product included in the first region by the person included in the second region is anomalous, based on the relationship and, when the motion is determined to be anomalous, outputs an alert indicating that a person making an anomalous motion with respect to a product has appeared.

Accordingly, according to the information processing device 10, an anomaly can be detected and an alert can be output at the time of specifying grabbing or the like over a plurality of times, as a relationship between a customer and a product not suited for bulk buying. Consequently, shoplifting in the store may be suppressed.

Second Embodiment

5. Application Examples

Incidentally, while the embodiments relating to the disclosed device has been described above, the embodiments may be carried out in a variety of different forms apart from the embodiments described above. Thus, in the following, application examples included in the embodiments will be described.

5-1. First Application Example

In the first embodiment described above, an example has been given in which an alert is output when the summed number of times of grabbing motions on the bulk-buying unsuitable product by the same person is equal to or more than the threshold value, but this is not restrictive. For example, when the position of the customer 2 grabbing a product of the store 3 is in a specified area where a predetermined product such as the bulk-buying unsuitable product is arranged, the information processing device 10 outputs an alert indicating that a person making an anomalous motion with respect to the product has appeared, based on the number of times the customer 2 makes motions of grabbing the product.

Figure 11:
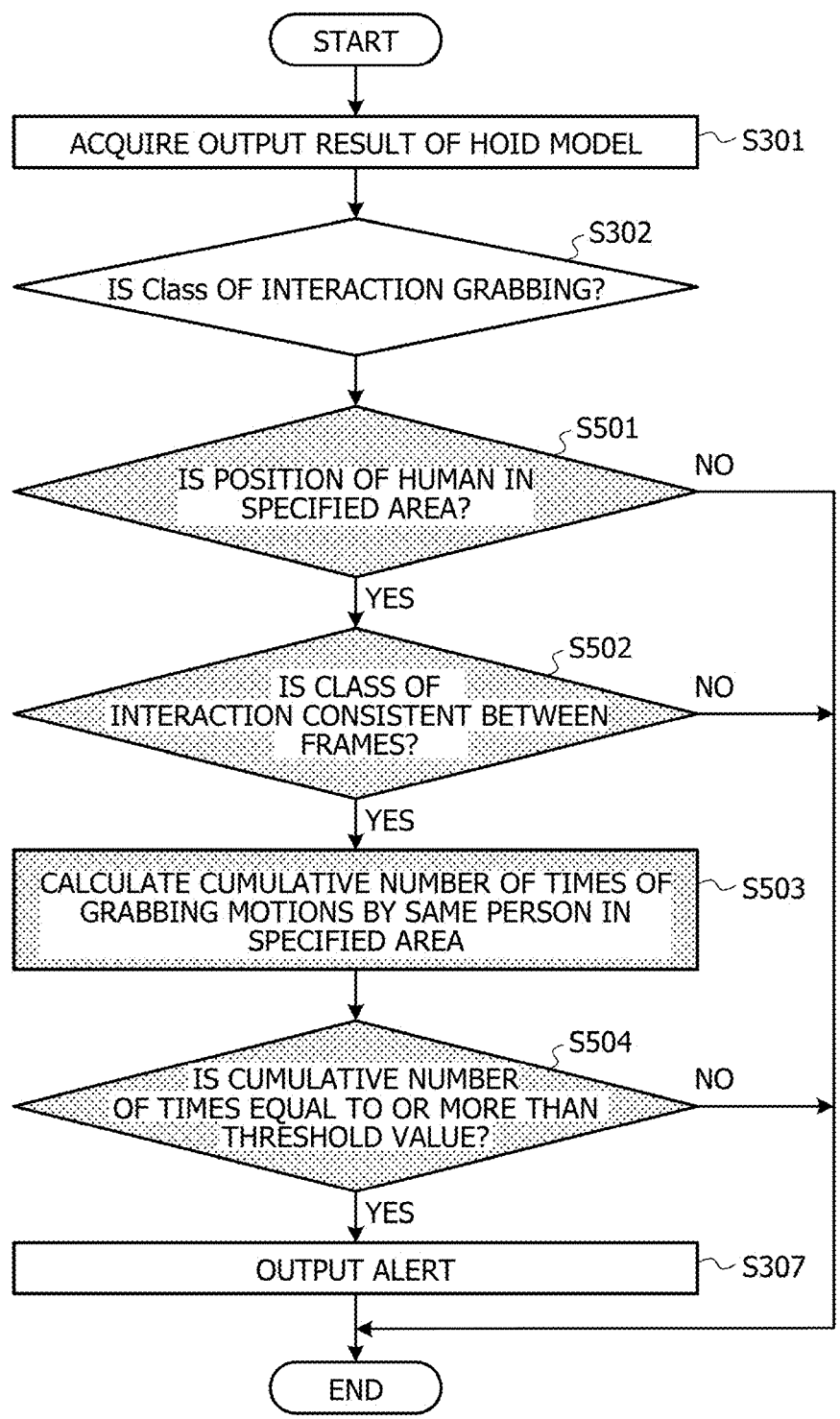
FIG. 11 is a flowchart illustrating a procedure of alert output processing according to a first application example.

FIG. 11 is a flowchart illustrating a procedure of alert output processing according to an application example. This processing is iteratively executed as long as the video data is acquired from the cameras 20, merely as an example. Note that, in the flowchart illustrated in FIG. 11, a step in which processing different from the processing illustrated in the flowchart illustrated in FIG. 10 is executed is denoted by a different number.

As illustrated in FIG. 11, a determination unit 15D acquires the output result of the HOID model corresponding to the new frame among the output results of the HOID model stored in an output result DB 13D (step S301).

Then, the determination unit 15D determines whether or not the class of the interaction indicating the relationship between the human and the object, which is included in the output result of the HOID model, is "grabbing" (step S302). At this time, when the class of interaction is "grabbing" (Yes in step S302), the determination unit 15D further determines whether or not the position of the human detected in the new frame is in a specified area where the bulk-buying unsuitable product is arranged (step S501).

Figure 12:
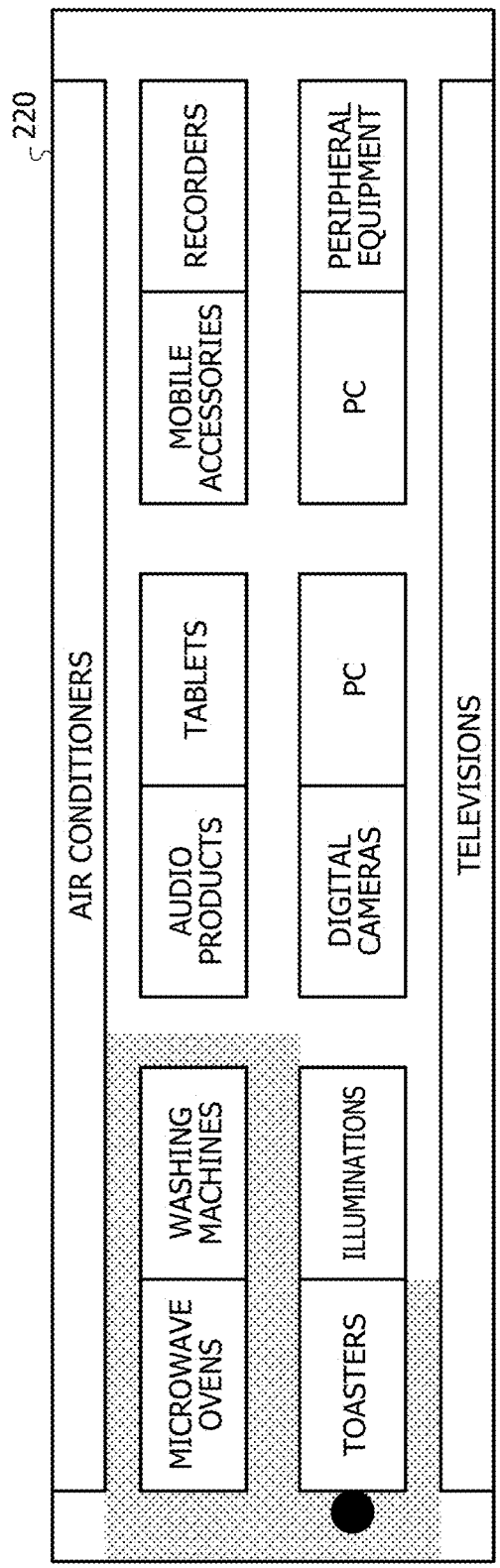
FIG. 12 is a diagram illustrating an example of a specified area.

FIG. 12 is a diagram illustrating an example of the specified area. In FIG. 12, a floor map 220 of a selling space of electrical appliances is illustrated, and the specified area of the floor map 220 where the bulk-buying unsuitable products such as a microwave oven, a toaster, and a washing machine are arranged are also indicated by hatching. It is determined in step S501 whether or not the position of the human detected in the new frame is included in such a specified area. Note that the position of the human can be detected by applying a known image processing technique to the image data of the new frame as mentioned above.

Then, when the position of the human detected in the new frame is within the specified area (Yes in step S501), the determination unit 15D executes determination as follows. That is, the determination unit 15D determines whether or not the class of the interaction obtained as the output result of the HOID model corresponding to the new frame and the class of the interaction obtained as the output result of the HOID model corresponding to the one preceding frame are consistent between the frames (step S502).

Here, when the classes of the interaction and the location area of the human are not consistent between the frames (No in step S502), it is found that the new frame corresponds to the timing at which the grabbing motion on the bulk-buying unsuitable product is started. In this case, the determination unit 15D calculates the cumulative number of times of grabbing motions on the product by the same person in the specified area, based on the history of the output results of the HOID model regarding the same person as the customer 2 detected in the new frame (step S503).

Merely as an example, the determination unit 15D specifies a frame section in which the face image included in the partial image of the human Bbox is similar to the face image of the customer 2 detected in the new frame, the position of the human is in the specified area, the class of interaction is "grabbing", and the same class of interaction continues. Based on the number of frame sections specified in this manner, the determination unit 15D calculates the cumulative number of times of grabbing motions on the product by the same person in the specified area.

Thereafter, the determination unit 15D determines whether or not the cumulative number of times of grabbing motions on the product by the same person in the specified area is equal to or more than a threshold value such as three times (step S504).

At this time, when the cumulative number of times of grabbing motions on the product by the same person in the specified area is equal to or more than the threshold value (Yes in step S504), the grabbing motions can be detected as an anomalous motion with respect to the product. In this case, an alert output unit 15E outputs an alert indicating that the customer 2 who is likely to shoplift the bulk-buying unsuitable product has appeared, to a store clerk terminal 50 (step S307) and ends the processing.

As described above, according to the alert output processing according to the first application example, shoplifting in the store may be suppressed as in the above first embodiment.

5-2. Second Application Example

The information processing device 10 can also analyze the number of products arranged in the area to which the human Bbox belongs, before and after identifying the motion of the customer 2 grabbing the product, and output an alert indicating that an anomalous motion of the customer 2 with respect to the product has occurred, based on the result of the analysis.

Merely as an example, the determination unit 15D determines whether or not the class of interaction included in the output result of the HOID model has transitioned from a class other than "grabbing" to "grabbing" between the new frame and the one preceding frame. At this time, when the class of interaction has transitioned from a class other than "grabbing" to "grabbing" between the new frame and the one preceding frame, the determination unit 15D executes processing as follows. That is, the determination unit 15D detects a difference in the region where the object Bbox is detected, such as the number or area of pixels having variations in pixel values equal to or more than a threshold value, as an example, between a frame preceding the new frame in which the class of interaction "grabbing" is detected and a frame following the new frame in which the class of interaction "grabbing" is detected.

Figure 13:
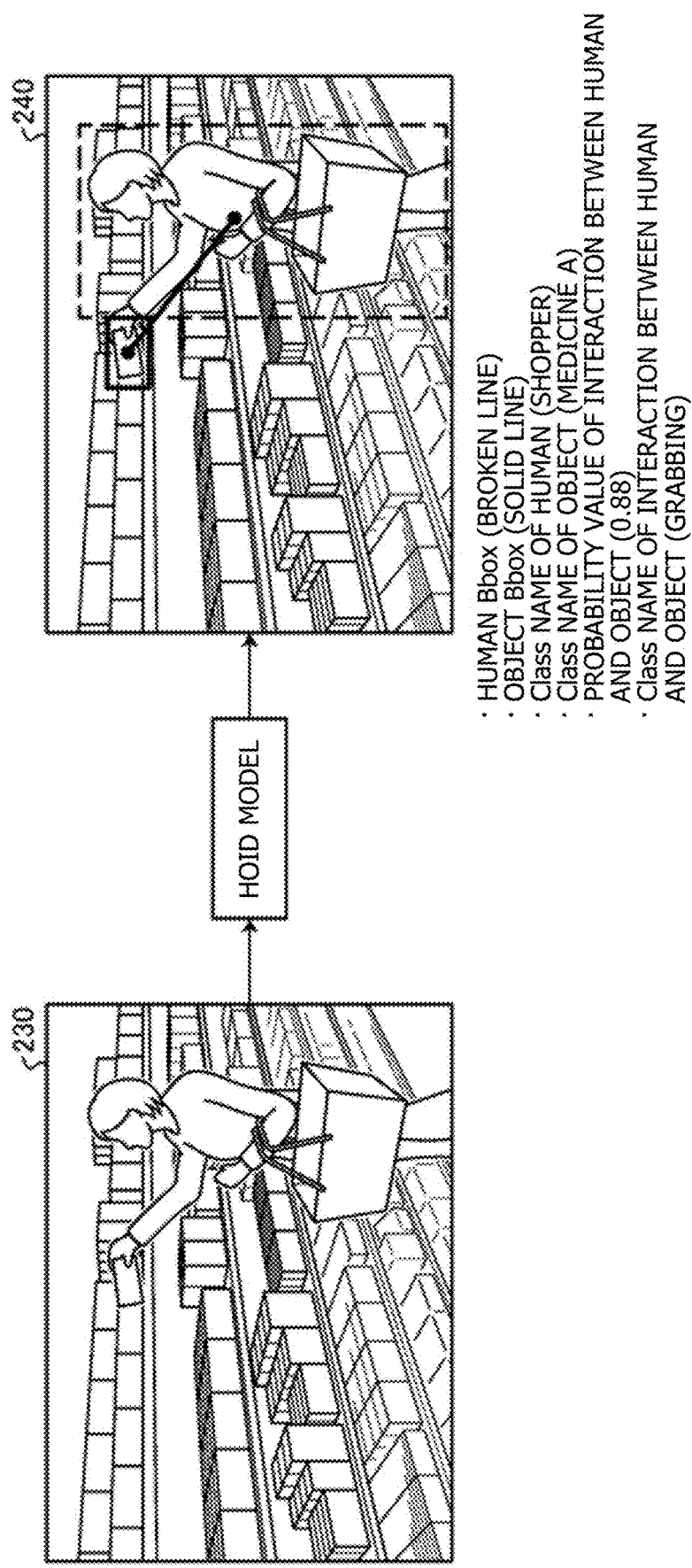
FIG. 13 is a diagram illustrating an output example of the HOID model.

FIG. 13 is a diagram illustrating an output example of the HOID model. FIG. 13 depicts image data that is input data to the HOID model and an output result of the HOID model. In FIG. 13, the human Bbox is indicated by the broken line frame, while the object Bbox is indicated by the solid line frame. As illustrated in FIG. 13, the output result of the HOID model includes the Bbox of a human "shopper", the Bbox of an object "medicine A", a probability value "0.88" and a class name "grabbing" of an interaction between the human and the object, and the like.

Figure 14:
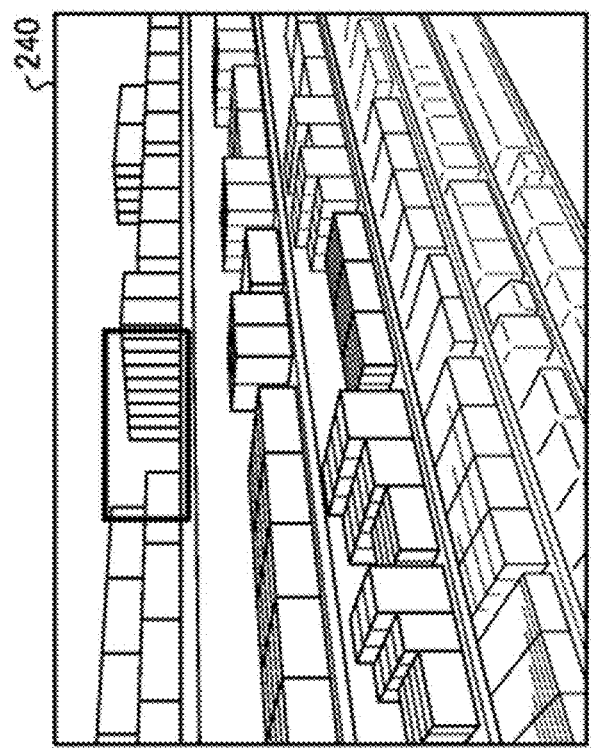
FIG. 14 is a diagram illustrating an example of a difference before and after a grabbing motion.
Figure 14:
Figure 14:
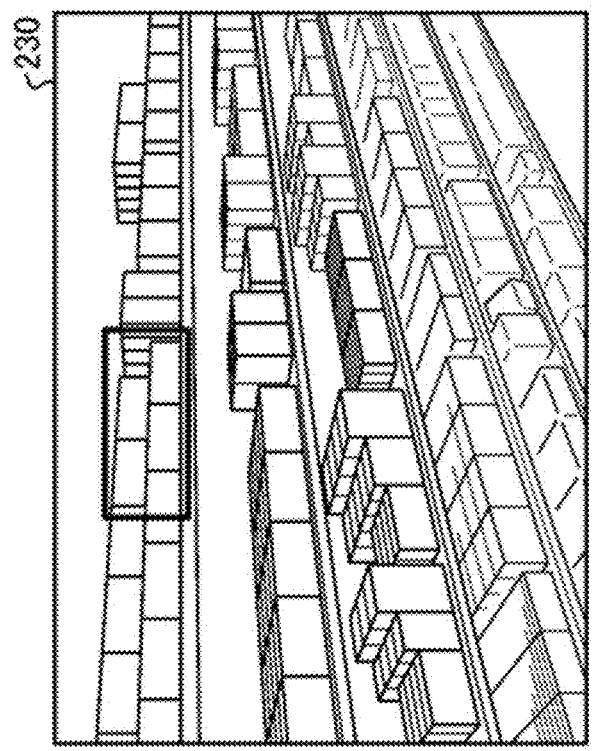

FIG. 14 is a diagram illustrating an example of a difference before and after a grabbing motion. FIG. 14 illustrates an image 230 of a frame preceding the new frame in which the class of interaction "grabbing" is detected and an image 240 of a frame following the new frame in which the class of interaction "grabbing" is detected. Furthermore, in the images 230 and 240 illustrated in FIG. 14, the region of the object Bbox detected in the new frame that has transitioned for the first time to the class of interaction "grabbing" is indicated by the thick line. The determination unit 15D determines whether or not the difference detected in the region of the object Bbox, such as the number or area of pixels having variations in pixel values equal to or more than the threshold value, is equal to or more than a threshold value. Here, merely as an example, the above threshold value can be set based on an area in which the pixel values will change due to taking away products when a large number of products are taken out to an excessive extent even for bulk buying. At this time, when the number or area of pixels whose differences detected in the region of the object Bbox are equal to or more than the threshold value is equal to or more than the threshold value, the alert output unit 15E outputs an alert indicating that an anomalous motion that is likely to be shoplifting of a large number of products has occurred.

5-3. Third Application Example

In the above first embodiment, an example in which the object recognition for the product and the identification of the product item are implemented by the HOID model has been given, but the identification of the product item does not necessarily have to be implemented by the HOID model. For example, the object recognition task for the product may be implemented by the HOID model, while the identification task for the product item may be implemented by a zero-shot discriminator or the like.

5-4. Numerical Values

The number of the cameras 20 and the self-checkout cash registers 30, numerical value examples, training data examples, the number of pieces of training data, the machine learning model, each class name, the number of classes, the data format, and the like used in the above embodiments are merely examples and can be optionally altered. In addition, the flow of the processing described in each flowchart can also be appropriately altered unless otherwise contradicted. In addition, models generated by various algorithms such as a neural network can be adopted for each model.

5-5. System

Pieces of information including a processing procedure, a control procedure, a specific name, various types of data, and parameters described above or illustrated in the drawings may be optionally altered unless otherwise noted.

In addition, specific forms of distribution and integration of constituent elements of each device are not limited to the forms depicted in the drawings. In other words, all or a part of the constituent elements of the device may be functionally or physically distributed or integrated in any units, according to various loads, use situations, or the like. Furthermore, all or an optional part of the respective processing functions of each device can be implemented by a central processing unit (CPU) and a program to be analyzed and executed by the CPU, or can be implemented as hardware by wired logic.

5-6. Hardware

Figure 15:
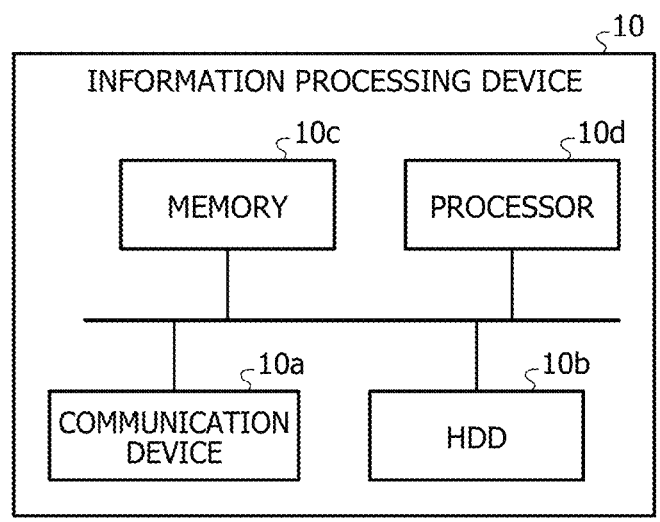
FIG. 15 is a diagram illustrating a hardware configuration example of the information processing device.

FIG. 15 is a diagram illustrating a hardware configuration example of the information processing device. Here, as an example, the information processing device 10 will be described. As illustrated in FIG. 15, the information processing device 10 includes a communication device 10a, a hard disk drive (HDD) 10b, a memory 10c, and a processor 10d. In addition, the respective units illustrated in FIG. 15 are mutually coupled by a bus or the like.

The communication device 10a is a network interface card or the like and communicates with another device. The HDD 10b stores programs and DBs that activate the functions illustrated in FIG. 2.

The processor 10d reads a program that executes processing similar to the processing of each processing unit illustrated in FIG. 2 from the HDD 10b or the like and loads the read program into the memory 10c, thereby activating a process that executes each function described with reference to FIG. 2 and the like. For example, this process executes a function similar to the function of each processing unit included in the information processing device 10. Specifically, the processor 10d reads a program having functions similar to the functions of the machine learning unit 15A, the video acquisition unit 15B, the specifying unit 15C, the determination unit 15D, the alert output unit 15E, and the like from the HDD 10b or the like. Then, the processor 10d executes a process that executes processing similar to the processing of the machine learning unit 15A, the video acquisition unit 15B, the specifying unit 15C, the determination unit 15D, the alert output unit 15E, and the like.

In this manner, the information processing device 10 works as an information processing device that executes an information processing method by reading and executing a program. In addition, the information processing device 10 can also implement functions similar to the functions in the embodiments described above by reading the above-mentioned program from a recording medium with a medium reading device and executing the read program mentioned above. Note that the program mentioned in other embodiments is not limited to being executed by the information processing device 10. For example, the embodiments described above may be similarly applied also to a case where another computer or server executes the program or a case where these computer and server cooperatively execute the program.

This program may be distributed via a network such as the Internet. In addition, this program may be recorded in a computer-readable recording medium such as a hard disk, a flexible disk (FD), a compact disc read only memory (CD-ROM), a magneto-optical disk (MO), or a digital versatile disc (DVD) and may be executed by being read from the recording medium by a computer.

Figure 16:
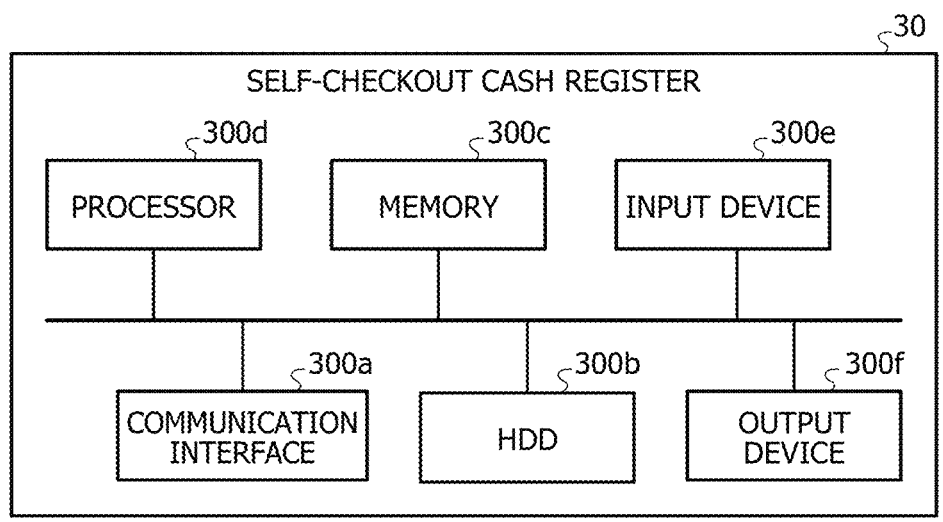
FIG. 16 is a diagram illustrating a hardware configuration example of a self-checkout cash register.

Next, the self-checkout cash register 30 will be described. FIG. 16 is a diagram illustrating a hardware configuration example of the self-checkout cash register 30. As illustrated in FIG. 16, the self-checkout cash register 30 includes a communication interface 300a, an HDD 300b, a memory 300c, a processor 300d, an input device 300e, and an output device 300f. In addition, the respective units illustrated in FIG. 16 are mutually coupled by a bus or the like.

The communication interface 300a is a network interface card or the like and communicates with another information processing device. The HDD 300b stores a program and data that activate each function of the self-checkout cash register 30.

The processor 300d is a hardware circuit that reads a program that executes processing of each function of the self-checkout cash register 30 from the HDD 300b or the like and loads the read program into the memory 300c, thereby activating a process that executes each function of the self-checkout cash register 30. That is, this process executes a function similar to the function of each processing unit included in the self-checkout cash register 30.

In this manner, the self-checkout cash register 30 works as an information processing device that executes action control processing, by reading and executing the program that executes processing of each function of the self-checkout cash register 30. In addition, the self-checkout cash register 30 can also implement each function of the self-checkout cash register 30 by reading the program from a recording medium with the medium reading device and executing the read program. Note that the program mentioned in other embodiments is not limited to being executed by the self-checkout cash register 30. For example, the present embodiments may be similarly applied also to a case where another computer or server executes the program or a case where these computer and server cooperatively execute the program.

In addition, the program that executes the processing of each function of the self-checkout cash register 30 can be distributed via a network such as the Internet. In addition, this program can be recorded in a computer-readable recording medium such as a hard disk, an FD, a CD-ROM, an MO, or a DVD and executed by being read from the recording medium by a computer.

The input device 300e detects various types of input operations by a user, such as an input operation for a program executed by the processor 300d. For example, the input operation includes a touch operation or the like. In the case of the touch operation, the self-checkout cash register 30 further includes a display unit, and the input operation detected by the input device 300e may be a touch operation on the display unit. For example, the input device 300e may be a button, a touch panel, a proximity sensor, and the like. In addition, the input device 300e reads a barcode. The input device 300e is, for example, a barcode reader. The barcode reader includes a light source and a light sensor and scans a barcode.

The output device 300f outputs data output from the program executed by the processor 300d via an external device coupled to the self-checkout cash register 30, such as an external display device as an example. Note that, when the self-checkout cash register 30 includes the display unit, the self-checkout cash register 30 does not have to include the output device 300f.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing an alert output program for causing a computer to execute a process comprising:
    acquiring a video of an inside of a store where products are arranged;
    specifying, from the acquired video, a first region that includes the products, a second region that includes a person of interest who is to purchase the products, and a relationship in which an interaction between the products and the person is identified, by analyzing the video;
    determining, when the relationship satisfies a predetermined condition, whether or not a motion carried out with respect to the products included in the first region by the person included in the second region has an anomaly, based on the relationship;
    identifying the motion of grabbing the products by the person, based on the relationship in which the interaction between the products and the person is identified;
    specifying an item of the products included in the first region, based on an image of the first region;
    when the specified item of the products represents a product not suited for a bulk buying, the determining determines whether or not the motion of the person with respect to the products has the anomaly, based on a number of times the person makes the motion of grabbing the products of a same type as the products; and
    outputting an alert that indicates that a person who makes an anomalous motion with respect to the products has appeared, when the motion is determined to have the anomaly.

2. The non-transitory computer-readable recording medium according to claim 1, wherein
    the determining includes: specifying a position in the store of the person included in the second region when the motion of grabbing the products by the person is identified; and, when the specified position is in an area where predetermined products are arranged, determining whether or not the motion of the person with respect to the products has the anomaly, based on a number of times the person makes the motion of grabbing the products in the area.

3. The non-transitory computer-readable recording medium according to claim 1, wherein
    the determining includes: by analyzing the video, analyzing a number of the products arranged in an area to which the second region belongs, before and after identifying the motion of grabbing the products by the person; and determining whether or not the motion of the person with respect to the products has the anomaly, based on a result of the analyzing.

4. The non-transitory computer-readable recording medium according to claim 1, wherein
    the determining includes determining whether or not the anomalous motion with respect to the products by the person has occurred, based on the first region, the second region, and the relationship, and
    the outputting includes: when determining that the anomalous motion has occurred, specifying a position in the store of the person included in the second region, based on the position of the second region; and notifying a terminal carried by a store clerk of the specified position together with the alert.

5. The non-transitory computer-readable recording medium according to claim 1, wherein
    the specifying includes specifying the first region, the second region, and the relationship, by inputting the acquired video to a machine learning model, and
    the machine learning model is a model for use in human object interaction detection (HOID) on which machine learning has been executed so as to identify a first class that indicates the person who is to purchase the products and first region information that indicates a region in which the person appears, a second class that indicates objects that include the products and second region information that indicates the region in which the objects appear, and the interaction between the first class and the second class.

6. The non-transitory computer-readable recording medium according to claim 1, wherein
    the specifying includes:
    specifying the first region, the second region, and a class that indicates the relationship between the first region and the second region, for the person and the products in the video, by inputting the acquired video to a machine learning model;
    specifying a period in which the class that indicates grabbing continues for the specified class of the relationship; and tracking the motion of grabbing the products by the person, based on the specified period in which the class that indicates the grabbing continues, and the determining includes determining whether the motion carried out with respect to the products included in the first region by the person included in the second region has the anomaly, based on a time length of the tracked motion of grabbing the products by the person.

7. An alert output method comprising:

acquiring a video of an inside of a store where products are arranged;

specifying, from the acquired video, a first region that includes the products, a second region that includes a person of interest who is to purchase the products, and a relationship in which an interaction between the products and the person is identified, by analyzing the video;

determining, when the relationship satisfies a predetermined condition, whether or not a motion carried out with respect to the products included in the first region by the person included in the second region has an anomaly, based on the relationship;

identifying the motion of grabbing the products by the person, based on the relationship in which the interaction between the products and the person is identified;

specifying an item of the products included in the first region, based on an image of the first region;

when the specified item of the products represents a product not suited for a bulk buying, determining whether or not the motion of the person with respect to the products has the anomaly, based on a number of times the person makes the motion of grabbing the products of a same type as the products; and outputting an alert that indicates that a person who makes an anomalous motion with respect to the products has appeared, when the motion is determined to have the anomaly.

8. An information processing device comprising:

a memory; and a processor coupled to the memory and configured to:

acquire a video of an inside of a store where products are arranged;

specify, from the acquired video, a first region that includes the products, a second region that includes a person of interest who is to purchase the products, and a relationship in which an interaction between the products and the person is identified, by analyzing the video;

determine, when the relationship satisfies a predetermined condition, whether or not a motion carried out with respect to the products included in the first region by the person included in the second region has an anomaly, based on the relationship;

identify the motion of grabbing the products by the person, based on the relationship in which the interaction between the products and the person is identified;

specify an item of the products included in the first region, based on an image of the first region;

when the specified item of the products represents a product not suited for a bulk buying, determine whether or not the motion of the person with respect to the products has the anomaly, based on a number of times the person makes the motion of grabbing the products of a same type as the products; and output an alert that indicates that a person who makes an anomalous motion with respect to the products has appeared, when the motion is determined to have the anomaly.

* * * * *